(12) United States Patent
Kakura et al.

(10) Patent No.: US 6,292,510 B1
(45) Date of Patent: Sep. 18, 2001

(54) AUTOMATIC EQUALIZATION METHOD AND AUTOMATIC EQUALIZER

(75) Inventors: Yoshikazu Kakura; Kazuhiro Okanoue; Tomoki Ohsawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/253,244

(22) Filed: Feb. 19, 1999

(30) Foreign Application Priority Data

Feb. 19, 1998 (JP) .................................................. 10/052666

(51) Int. Cl.$^7$ ...................................................... H03H 7/30
(52) U.S. Cl. ......................... 375/230; 375/350; 708/323
(58) Field of Search ................................... 375/229, 230, 375/346, 350; 708/300, 323

(56) References Cited

U.S. PATENT DOCUMENTS

| | | | | |
|---|---|---|---|---|
| 5,272,726 | * | 12/1993 | Furuya et al. | 375/94 |
| 5,287,385 | * | 2/1994 | Sugawara et al. | 375/12 |
| 5,303,263 | * | 4/1994 | Shoji et al. | 375/11 |
| 5,596,607 | * | 1/1997 | Larsson et al. | 375/340 |
| 5,844,946 | * | 12/1998 | Nagayasu | 375/341 |

FOREIGN PATENT DOCUMENTS 7-22970   1/1995   (JP) .

OTHER PUBLICATIONS

Mourot, C. "A High Bit Rate Transmission Technique in mobile Radio Cellular Environment" IEEE Vehicular Technology Society Conference, May 10–13, 1992, p. 740–743.

Guren, H. and N. Holte, "Decision Feedback Sequence Estimation for Continuous Phase Modulation on a Linear Multipath Channel" IEEE transactions on Communications, vol. 41, No. 2, Feb. 1993, p. 280–284.

Proakis, "Digital Communications", McGraw–Hill, New York, 1983, p. 410.

* cited by examiner

Primary Examiner—Stephen Chin
Assistant Examiner—Dac V. Ha
(74) Attorney, Agent, or Firm—Scully, Scott, Murphy & Presser

(57) ABSTRACT

An automatic equalizer comprises a transmission symbol sequence generation circuit 101, a parallel received signal estimation circuit 102, subtracters 103-1 through 103-6, absolute value squaring arithmetic circuits 104-1 through 104-6, adders 105-1 through 105-4, and a discriminator 106. Maximum likelihood estimation can be performed with simple operations by means of using added error signals given by adding square error signals obtained from estimated error signals for an N number of delayed received signals delayed by a time instant corresponding to 0 through (N−1) symbols, to select the transmission symbol sequence having the smallest error.

5 Claims, 4 Drawing Sheets

AUTOMATIC EQUALIZATION METHOD AND AUTOMATIC EQUALIZER

BACKGROUND OF THE INVENTION

The present invention relates to an automatic equalization method and an automatic equalizer for automatically equalizing the signal distorted due to intersymbol interference.

A well-known type of automatic equalizers adapted to perform maximum likelihood sequence estimation is those using a Viterbi algorithm. The automatic equalizers using the Viterbi algorithm are disclosed in, for example, Japanese Patent Laid-open No. 7-22970 and Proakis, "Digital Communications", McGraw-Hill, N.Y. 1983, page 410. These automatic equalizers perform the maximum likelihood sequence estimation by using the Viterbi algorithm. However, the automatic equalizer of the type described has a disadvantage that the number of arithmetic operations increases due to the complex Viterbi calculation.

Therefore, an object of the present invention is to provide an automatic equalization method that can provide the maximum likelihood sequence estimation with simple arithmetic operations.

Another object of the present invention is to provide an automatic equalizer which is suitable for the above-mentioned automatic equalization method.

SUMMARY OF THE INVENTION

An automatic equalization method according to the present invention is used to receive and equalize a digital data signal comprising transmission symbols adapted to have k levels.

According to an aspect of the present invention, the method comprises the steps of receiving a channel impulse response having a length of M (where M is a natural number), a $k^{m-j}$ number of transmission symbol sequences each having a length of (M–j) ($0 \leq j \leq M-1$, where j is an integer), and a discrimination result, to produce a $(k^{k-j}+k^{(M-j-1)}+ \ldots +k^{(M-j-N+1)})$ number of estimated received signals ($N \leq (M-j)$, where N is a natural number); subtracting the $(k^{(M-j)}+k^{(M-j-1)}+ \ldots +k^{(M-j-N+1)})$ number of estimated received signals from an N number of delayed received signals r(m), r(m–1), ..., (m–(N–1), respectively, the N number of delayed received signals being between a received signal at a time instant m and a received signal at a time instant (m–(N–1)), to produce a $(k^{(M-j)}+k^{(M-j-1)}+ \ldots +k^{(M-j-N+1)})$ number of estimated error signals; squaring the $(k^{(M-j)}+k^{(M-j-1)}+ \ldots +k^{(M-j-N+1)})$ number of estimated error signals to produce a $(k^{(M-j)}+k^{(m-j-1)}+ \ldots +k^{(m-j-N+1)})$ number of square error signals; receiving the $(k^{(M-j)}+k^{(m-j-1)}+ \ldots +k^{(m-j-N+1)})$ number of square error signals to add thereto the square error signals, respectively, obtained from the $(k^{(M-j)}+k^{(M-j-1)}+ \ldots +k^{(M-j-N+1)})$ number of square error signals in accordance with an N number of estimated received signals having the same previous transmission symbol sequence, thereby to produce a $k^{(M-j)}$ number of added error signals; and producing, as the discrimination result, a portion of the transmission symbol sequence that corresponds to the minimum one of the $k^{(M-j)}$ number of added error signals.

An automatic equalizer according to the present invention is supplied with and equalizes a digital data signal comprising transmission symbols adapted to have k levels.

According to an aspect of the present invention, the automatic equalizer comprises a parallel received signal estimation circuit that is supplied with a channel impulse response having a length of M (where M is a natural number), a $k^{(M-j)}$ number of transmission symbol sequences each having a length of (M–j) ($0 \leq j \leq (M-1)$, where j is an integer), and a discrimination result and that produces a $(k^{(M-j)}+k^{(M-j-1)}+ \ldots +k^{(M-j-N+1)})$ number of estimated received signals ($N \leq M-j$, where N is a natural number). The automatic equalizer further comprises a group of a plurality of estimated error output circuits that are supplied with at least one of an N number of delayed received signals r(m), r(m–1), ..., r(m–(N–1), and supplied with the estimated received signals, respectively, the delayed received signals being between a received signal at a time instant m and a received signal at a time instant (m–(N–1)), and that produce a $(k^{(M-j)}+k^{(M-j-1)}+ \ldots +k^{(M-j-N+1)})$ number of estimated error signals. The automatic equalizer still further comprises a group of a plurality of absolute value squaring arithmetic circuits that are supplied with the $(k^{(M-j)}+k^{(M-j-1)}+ \ldots +k^{(M-j-N+1)})$ number of estimated error signals and that produce a plurality of square error signals by carrying out absolute value squaring arithmetic operation. The automatic equalizer yet further comprises a group of a $k^{(M-j)}$ number of adders that are supplied with the $(k^{(M-j)}+k^{(M-j-1)}+ \ldots +k^{(M-j-N+1)})$ number of square error signals to add thereto the square error signals, respectively, obtained from the $(k^{(M-j)}+k^{(M-j-1)}+ \ldots +k^{(M-j-N+1)})$ number of square error signals in accordance with an N number of estimated received signals having the same previous transmission symbol sequence, thereby to produce a $k^{(M-j)}$ number of added error signals, and a discriminator that is supplied with the $k^{(M-j)}$ number of added error signals and that produces, as the discrimination result, a portion of the transmission symbol sequence that corresponds to the minimum one of the $k^{(M-j)}$ number of added error signals.

DESCRIPTION OF THE PREFERRED EMBODIMENTS

Figure 1:
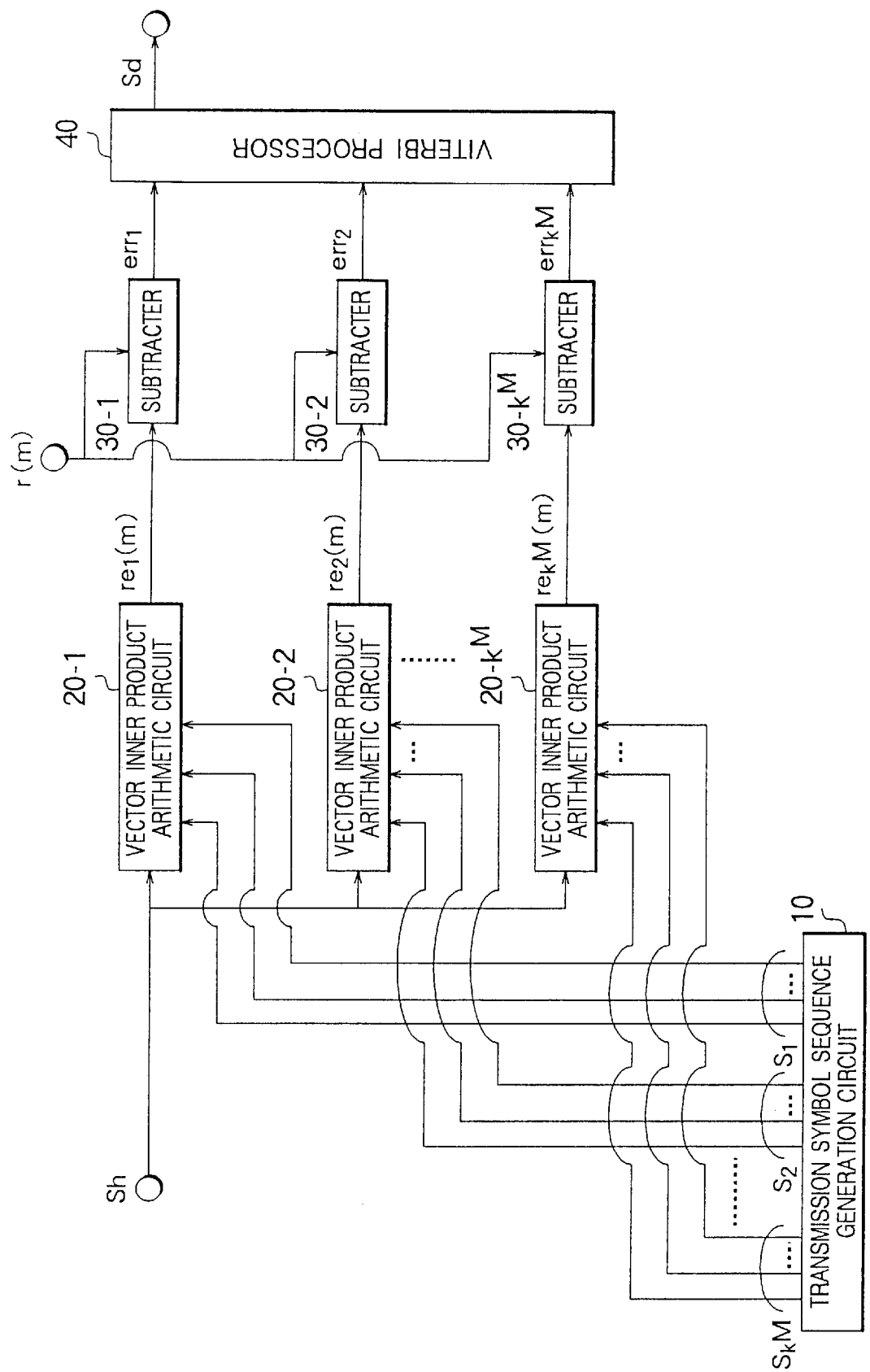
FIG. 1 is a block diagram showing a circuit configuration of a conventional automatic equalizer.

Referring to FIG. 1, a conventional automatic equalizer is described for the purpose of facilitating the understanding of the present invention. This automatic equalizer is disclosed in the above-mentioned "Digital Communications" (Proakis, McGraw-Hill, N.Y., 1983, page 410). These automatic equalizer is applied to the communication using a digital data signal comprising transmission symbols adapted to have k levels.

In FIG. 1, a transmission symbol sequence generation circuit 10 produces a $k^M$ number of transmission symbol sequences $S_1$ through $S_kM$ each having a length of M. Vector inner product arithmetic operation circuits 20-1 through 20-$k^M$ obtain an inner product of a channel impulse response Sh having the length of M with the transmission symbol sequences $S_1$ through $S_kM$ each having the length of M and produce the respective results as a $k^M$ number of estimated received signals $re_1$(m) through $re_kM$(m) at a time instant m.

Subtracters 30-1 through 30-$k^M$ subtract a $k^M$ number of the estimated received signals $re_1$(m) through $re_kM$(m), respectively, from the received signal r(m) to produce a $k^M$ number of estimated error signals $err_1$ through $err_kM$. A Viterbi processor 40 receives a $k^M$ number of the estimated error signals $err_1$ through $err_kM$ and selects the maximum likelihood sequence out of the $K^M$ number of the transmission symbol sequences $S_1$ through $S_kM$ by using the Viterbi algorithm. The Viterbi processor 40 then determines the least significant symbol as a value obtained by removing a distortion component from the received signal r(m) and supplies it to the outside as a discrimination output signal Sd.

As described above, the conventional automatic equalizer performs the maximum likelihood sequence estimation by using the Viterbi algorithm. However, the automatic equalizer of the type described has a disadvantage that the number of arithmetic operations increases due to the complex Viterbi calculation.

Figure 2:
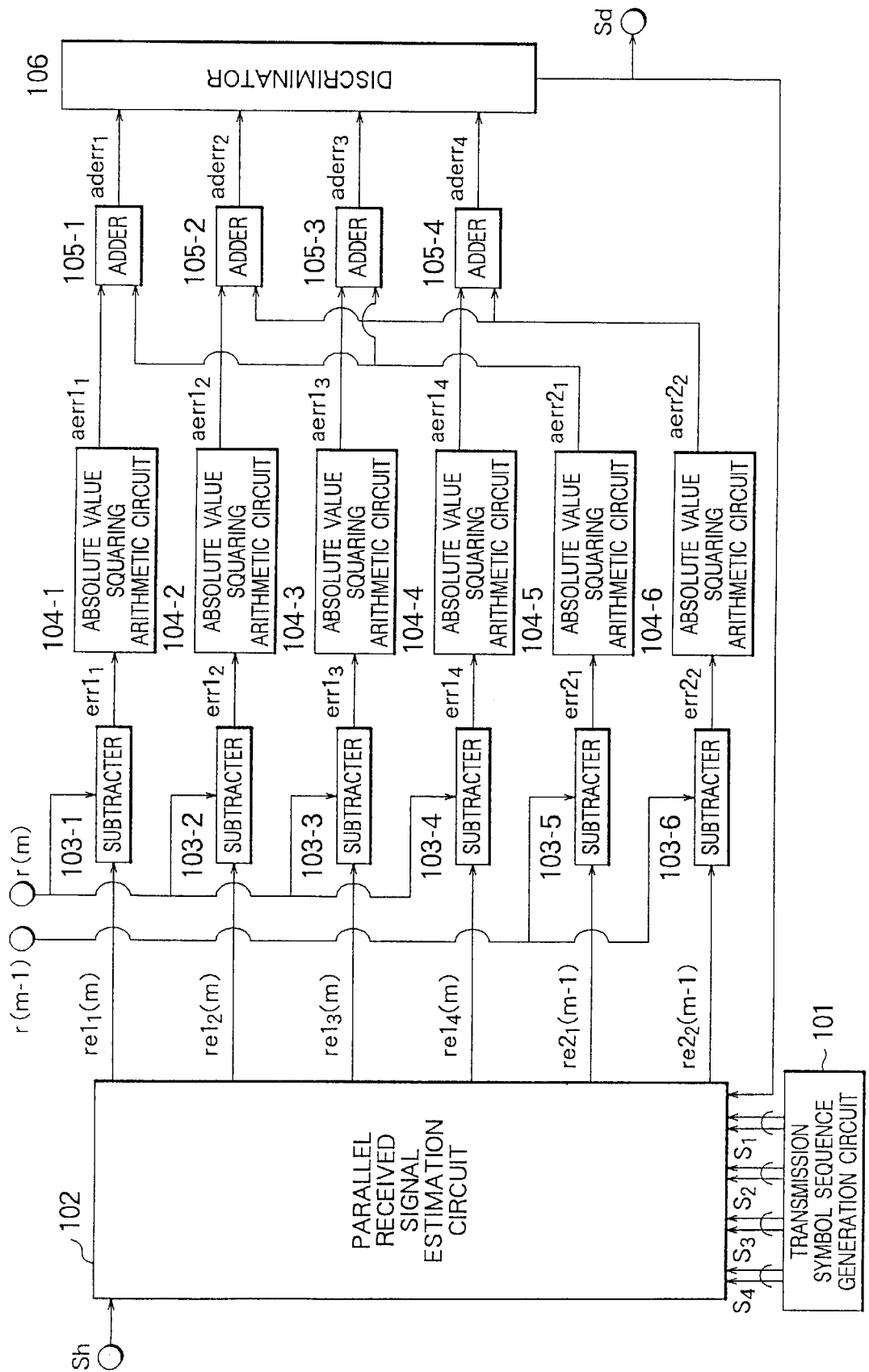
FIG. 2 is a block diagram showing a circuit configuration of an automatic equalizer according to the present invention.

Referring to FIG. 2, an automatic equalizer according to the present invention is described. The embodiment illustrated in FIG. 2 is a case where N is equal to 2.

In FIG. 2, a transmission symbol sequence generation circuit 101 produces a $2^2$ number of transmission symbol sequences $S_1$ through $S_4$ each having the length of 2. A parallel received signal estimation circuit 102 is supplied with a channel impulse response vector Sh having a length of (2+j) ($0 \leq j \leq 1$, where j is an integer), transmission symbol sequences $S_1$ through $S_4$ of which symbol value is represented in binary as {0} or {1}, and a discrimination result Sd. In response to them, the parallel received signal estimation circuit 102 produces a $2^2$ number of first estimated received signals $re1_1(m)$ through $re1_4(m)$ for a received signal r(m) at a time instant m as well as two second estimated received signals $re2_1$ (m−1) and $re2_2$ (m−1) for a delayed received signal r(m−1) at a time instant (m−1).

A $2^2$ number of subtracters (estimated error output r circuits) 103-1 through 103-4 are supplied with the first estimated received signals $re1_1(m)$ through $re1_4(m)$, respectively, and the received signal r(m). The subtracters 103-1 through 103-4 then produce a $2^2$ number of first estimated error signals $err1_1$ through $err1_4$, respectively. Two subtracters 103-5 and 103-6 are supplied with the second estimated received signals $re2_1(m-1)$ through $re2_2$ (m−1), respectively, and the delayed received signal r(m−1). The subtracters 103-5 and 103-6 then produce two second estimated error signals $err2_1$ through $err2_2$, respectively.

A $2^2$ number of absolute value squaring arithmetic circuits 104-1 through 104-4 are supplied with the first estimated error signals $err1_1$ through $err1_4$, respectively, and produce a $2^2$ number of first square error signals $aerr1_1$ through $aerr1_4$, respectively. Two absolute value squaring arithmetic circuits 104-5 and 104-6 are supplied with the estimated error signals 2, $err2_1$ and $err2_2$, respectively, and produce two second square error signals $aerr2_1$ and $aerr2_2$, respectively.

A $2^2$ number of adders 105-1 through 105-4 perform the following adding operation. The adder 105-1 adds the first square error signal aerr1 to the second square error signal $aerr2_1$. The adder 105-2 adds the first square error signal $aerr1_2$ to the second square error signal $aerr2_2$. The adder 105-3 adds the first square error signal $aerr1_3$ to the second square error signal $aerr2_1$. The adder 105-4 adds the first square error signal $aerr1_4$ to the second square error signal $aerr2_2$. The adders 105-1 through 105-4 produce added error signals $aderr_1$ through $aderr_4$, respectively.

A discriminator 106 is supplied with the added error signals $aderr_1$ through $aderr_4$ and produces a discrimination output signal as the discrimination result Sd, a portion of one of the transmission symbol sequences $S_1$ through $S_4$ that corresponds to the minimum one of the added error signals $aderr_1$ through $aderr_4$. The above-mentioned operation provides the maximum likelihood sequence estimation with the simple operation.

Figure 3:
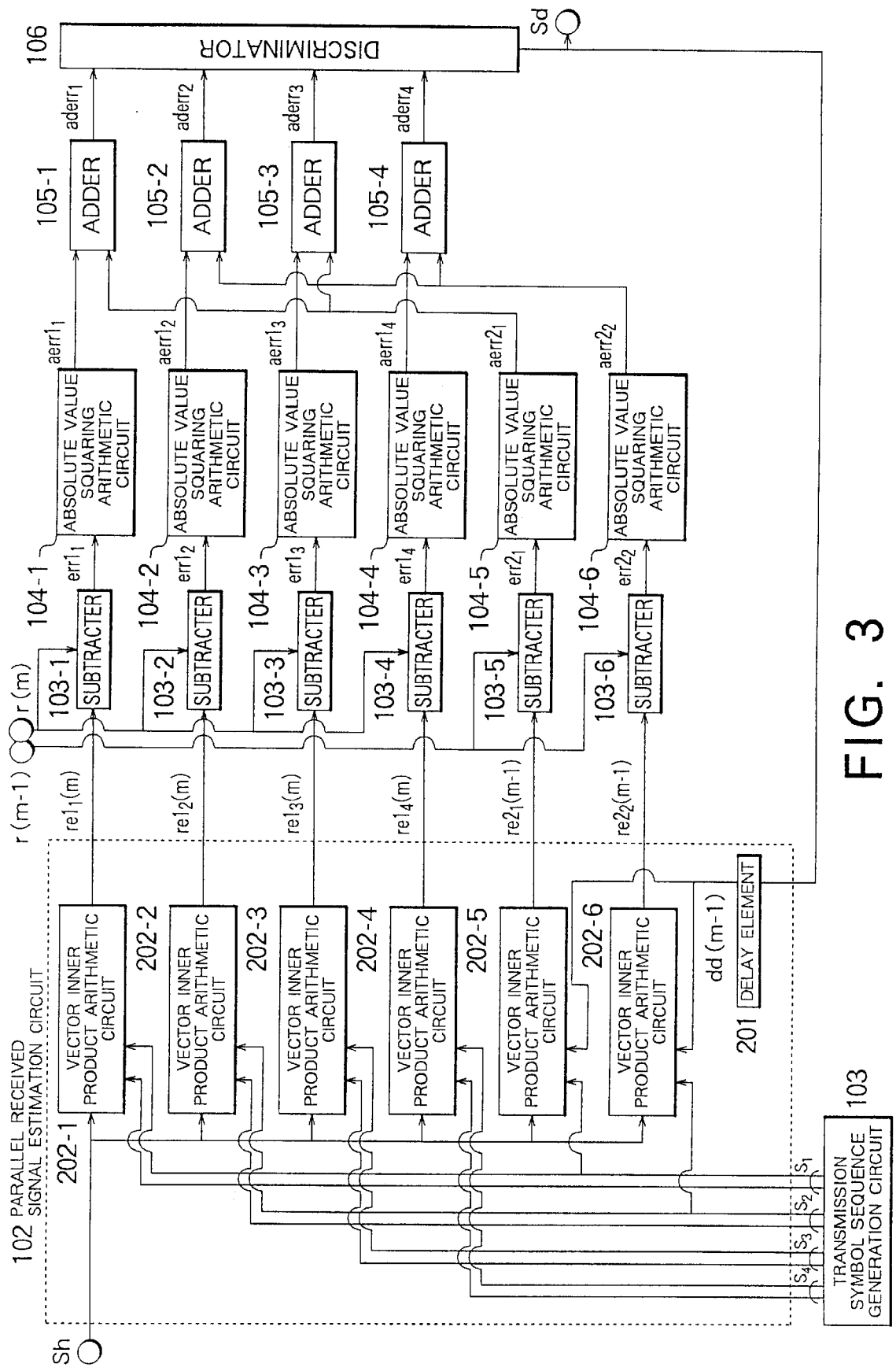
FIG. 3 is a block diagram showing an example of a parallel received signal estimation circuit in FIG. 2.

Provided that M is equal to 2 and j is equal to 0 in the configuration in FIG. 2, the parallel received signal estimation circuit 102 can be realized by the configuration shown in FIG. 3. A delay element 201 is supplied with the discrimination result Sd and delays it by the time interval corresponding to one symbol to produce the delayed signal as a delayed discrimination result dd(m−1). Vector inner product arithmetic circuits 202-1 through 202-4 obtain an inner product of a channel impulse response vector $Sh(h_{-1}, h_0)$ formed of the elements of the channel impulse response vectors each having the length of two with a transmission signal candidate vector having the transmission symbol sequences Si through $S_4$ as the elements. The vector inner product arithmetic circuits 202-1 through 202-4 then produce the $2^2$ number of first estimated received signals $re1_1(m)$ through $re1_4(m)$, respectively, that are corresponding to the received signal r(m). Vector inner product arithmetic circuits 202-5 and 202-6 obtain an inner product of the impulse response vector Sh with a transmission symbol candidate vector having one lower transmission symbol sequence of the respective transmission symbol sequences $S_1$ through $S_4$ and the delayed discrimination result dd (m−1) as the elements. The vector inner product arithmetic circuits 202-5 and 202-6 produce two second estimated received signals $re2_1$ (m−1) and $re2_2$ (m−1), respectively, each of which corresponds to the delayed received signal r(m−1).

For example, it is assumed that the transmission symbol sequences $S_1=\{S_1(2), S_1(1)\}=\{0, 0\}$, $S_2=\{S^2(2), S_2(1)\}=\{0, 1\}$, $S_3=\{S_3(2), S_3(1)\}=\{1, 0\}$, and $S_4=\{S_4(2), S_4(1)\}=\{1, 1\}$, the received signal r(m)=0.24, the delayed received signal r(m−1)=0.15, the channel impulse response vector $Sh=\{h_{-1}, h_0\}=\{0.2, 0.3\}$ and the delayed discrimination result dd(m−1) =0.

The first estimated received signals re11(m) through $re1_4$ (m) for the respective transmission symbol sequences $S_1$ through $S_4$ are given by the following equations:

$re1_1(m)=h_{-1} \times S_1(2)+h_0 \times S_1(1) =0.2\times 0+0.3\times 0=0$
$re1_2(m)=h_{-1} \times S_2(2)+h_0 \times S_2(1) =0.2\times 0+0.3\times 1=0.3$
$re1_3(m)=h_{-1} \times S_3(2)+h_0 \times S_3(1) =0.2\times 1+0.3\times 0=0.2$
$re1_4(m)=h_{-1}\times S_4(2)+h_0\times S_4(1) =0.2\times 1+0.3\times 1=0.5$ The second estimated received signals $re2_1(m-1)$ and $re2_2(m-1)$ are given by the following equations:

$re2_2(m-1)=h_1\times S_1(1)+h_0\times dd(m-1) =0.2\times 0+0.3\times 0=0$
$re2_2(m-1)=h_{-1}\times S_2(1)+h_0\times dd(m-1) =0.2\times 1+0.3\times 0=0.2$ It is noted that $S_3(1)$ is equal to $S_1(1)$ and $S_4(1)$ is equal to $S_2(1)$, so that only two equations should be calculated for the second estimated received signal.

In this event, the first estimated error signals $err1_1$ through $err1_4$ are given by the following equations:

$err1_1=r(m)-re1_1(m)=0.24-0=0.24$
$err1_2=r(m)-re1_2(m)=0.24-0.3=-0.06$
$err1_3=r(m)-re1_3(m)=0.24-0.2=0.04$
$err1_4=r(m)-re1_4(m)=0.24-0.5=-0.26$ The second estimated error signals $err2_1$ and $err2_2$ are given by the following equations:

$err2_1=r(m-1)-re2_1(m-1)=0.15-0=0.15$
$err2_2=r(m-1)-re2_2(m-1)=0.15-0.2=-0.05$ The first square error signals $aerr1_1$ through $aerr1_4$ are given by the following equations:

$aerr1_1=|err1_1|^2=|0.24|_2=0.0576$
$aerr1_2=|err1_2|^2=|-0.06|^2=0.0036$
$aerr1_3=|err1_3|^2=|0.04|^2=0.0016$
$aerr1_4=err1_4|^2=|-0.26|^2=0.0676$ The second square error signals $aerr2_1$ and $aerr2_2$ are given by the following equations:

$aerr2_1=|err2_1|^2=|0.15|^2=0.0225$
$aerr2_2=|err2_2|^2=|-0.05|^2=0.0025$

The added error signals aderr, through $aderr_4$ are given by the following equations:

$aderr_1=aerr1_1+aerr2_1=0.0576+0.0225=0.0801$
$aderr_2=aerr1_2+aerr2_2=0.0036+0.0025=0.0061$
$aderr_3=aerr1_3+aerr2_3=0.0016+0.0225=0.0241$
$aderr_4=aerr1_4+aerr2_4=0.0676+0.0025=0.0701$ More specifically, the first square error signal having the smallest value is $aerr1_3$ when the estimation is made only for the received signal r(m). In this case, the discriminator 106 selects the sequence {1, 0} and the discrimination result Sd is {0} that is the least significant symbol. In addition, the first absolute value error signal $aerr1_2$ is close in value to $aerr1_{31}$ indicating that incorrect discrimination due to noises is tend to be caused.

On the other hand, the estimation can be made with higher accuracy when it is made for both the received signal r(m) and the delayed received signal r(m−1), as compared with the estimation made for only the received signal r (m). In this case, the added error signal having the smallest value is $aderr_2$. The discriminator 106 selects the sequence {0, 1} and the discrimination result Sd is {1} that is the least significant symbol.

This result differs from the one obtained when the estimation is made only for the received signal r(m). In addition, a difference between the added error signal $aderr_2$ and any one of the remaining added error signals is larger than that obtained for $aerr_1$, indicating that the discrimination according to the present invention has a lower possibility of incorrect discrimination due to noises and there is a higher probability that {0, 1} is the correct maxim=likelihood sequence.

Figure 4:
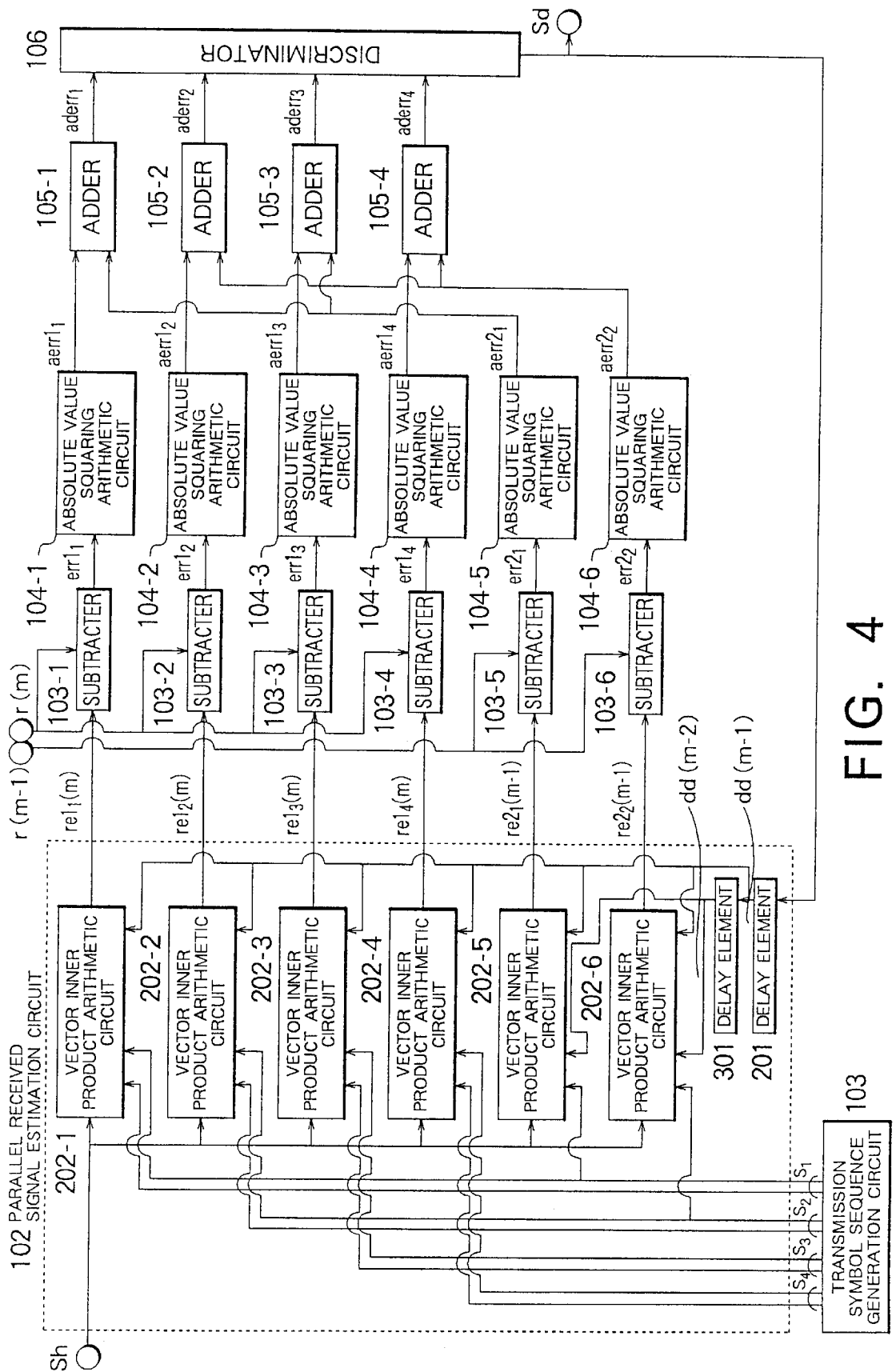
FIG. 4 is a block diagram showing another example of a parallel received signal estimation circuit in FIG. 2.

Provided that M is equal to 3 and j is equal to 1 in the configuration in FIG. 2, the parallel received signal estimation circuit 102 can be realized by the configuration shown in FIG. 4.

The delay element 201 is supplied with the discrimination result Sd and delays it by the time interval corresponding to one symbol to produce the delayed signal as the delayed discrimination result dd(m−1). A delay element 301 is supplied with the delayed discrimination result dd(m−1) and delays it by the time interval corresponding to one symbol to produce the delayed signal as a delayed discrimination result dd(m−2). Vector inner product arithmetic circuits 202-1 through 202-4 obtain an inner product of a channel impulse response vector Sh ($h_{-1}$, $h_0$, $h_1$,) formed of the elements of the channel impulse response vectors each having the length of three with a transmission signal candidate vector having the transmission symbol sequences $S_1$ through $S_4$ and the delayed discrimination result dd(m−1) as the elements. The vector inner product arithmetic circuits 202-1 through 202-4 then produce a $2^2$ number of first estimated received signals $re1_1$ (m) through $re1_4$(m), respectively, that are corresponding to the received signal r(m).

Vector inner product arithmetic circuits 202-5 and 202-6 obtain an inner product of the impulse response vector Sh with a transmission symbol candidate vector having one lower transmission symbol sequence of the respective transmission symbol sequences Si through S4 and the delayed discrimination results dd(m−1) and dd(m−2) as the elements. The vector inner product arithmetic operation circuits 202-5 and 202-6 produce two second estimated received signals $re2_1$(m−1) and $re2_2$(m−1), respectively, each of which corresponds to the delayed received signal r(m−1).

For example, it is assumed that the transmission symbol sequences $S_1=\{S_1(2), S_1(1)\}=\{0, 0\}$, $S_2=\{S^2(2), S_2(1)\}=\{0, 1\}$, $S_3=\{S_3(2), S_3(1)\}=\{1, 0\}$, and $S_4=\{S_4(2), S_4(1)\}=\{1, 1\}$, the received signal r(m)=0.24, the delayed received signal r(m−1)=0.15, the channel impulse response vector Sh=$\{h_{-1}, h_0\}=\{0.2, 0.3\}$ and the delayed discrimination result dd(m−1) =0.

The first estimated received signals re11(m) through $re1_4$ (m) for the respective transmission symbol sequences $S_1$ through $S_4$ are given by the following equations:

$re1_1(m)=h_{-1} \times S_1(2)+h_0 \times S_1(1) =0.2 \times 0+0.3 \times 0=0$
$re1_2(m)=h_{-1} \times S_2(2)+h_0 \times S_2(1) =0.2 \times 0+0.3 \times 1=0.3$
$re1_3(m)=h_{-1} \times S_3(2)+h_0 \times S_3(1) =0.2 \times 1+0.3 \times 0=0.2$
$re1_4(m)=h_{-1} \times S_4(2)+h_0 \times S_4(1) =0.2 \times 1+0.3 \times 1=0.5$ The second estimated received signals $re2_1$(m−1) and $re2_2$(m−1) are given by the following equations:

$re2_2(m-1)=h_1 \times S_1(1)+h_0 \times dd(m-1) =0.2 \times 0+0.3 \times 0=0$
$re1_4(m)=h_{-1} \times S_4(2)+h_0 \times S_4(1) =0.2 \times 1+0.3 \times 1=0.5$ The second estimated received signals $re2_1$(m−1) and $re2_2$(m−1) are given by the following equations:

$re2_2(m-1)=h_1 \times S_1(1)+h_0 \times dd(m-1) =0.2 \times 0+0.3 \times 0=0$
$re2_2(m-1)=h_{-1} \times S_2(1)+h_0 \times dd(m-1) =0.2 \times 1+0.3 \times 0=0.2$ It is noted that $S_3(1)$ is equal to $S_1(1)$ and $S_4(1)$ is equal to $S_2(1)$, so that only two equations should be calculated for the second estimated received signal.

In this event, the first estimated error signals $err1_1$ through $err1_4$ are given by the following equations:

$err1_1=r(m)-re1_1(m)=0.24-0=0.24$
$err1_2=r(m)-re1_2(m)=0.24-0.3=-0.06$
$err1_3=r(m)-re1_3(m)=0.24-0.2=0.04$
$err1_4=r(m)-re1_4(m)=0.24-0.5=-0.26$ The second estimated error signals $err2_1$ and $err2_2$ are given by the following equations:

$err2_1=r(m-1)-re2_1(m-1)=0.15-0=0.15$
$err2_2=r(m-1)-re2_2(m-1)=0.15-0.2=-0.05$ The first square error signals $aerr1_1$ through $aerr1_4$ are given by the following equations:

$aerr1_1=|err1_1|^2=|0.24|_2=0.0576$
$aerr1_2=|err1_2|^2=|-0.06|^2=0.0036$
$aerr1_3=|err1_3|^2=|0.04|^2=0.0016$
$aerr1_4=err1_4|^2=|-0.26|^2=0.0676$ The second square error signals $aerr2_1$ and $aerr2_2$ are given by the following equations:

$aerr2_1=|err2_1|^2=|0.15|^2=0.0225$
$aerr2_2=|err2_2|^2=|-0.05|^2=0.0025$

The added error signals aderr, through $aderr_4$ are given by the following equations:

$aderr_1=aerr1_1+aerr2_1=0.0576+0.0225=0.0801$
$aderr_2=aerr1_2+aerr2_2=0.0036+0.0025=0.0061$
$aderr_3=aerr1_3+aerr2_3=0.0016+0.0225=0.0241$
$aderr_4=aerr1_4+aerr2_4=0.0676+0.0025=0.0701$ As in the case described in conjunction with FIG. 3, the discriminator 106 selects the sequence {1, 0} and the discrimination result Sd is {0} that is the least significant symbol when the estimation is made only for the received signal r(m). In addition, the absolute value error signal aerr1$_2$ is close in value to aerr13, indicating that incorrect discrimination due to noises is tend to be caused.

On the other hand, the discriminator 106 selects the sequence {0, 1} and the discrimination result Sd is {1} that is the least significant symbol when it is made for both the received signal r(m) and the delayed received signal r(m−1). This result differs from the one obtained when the estimation is made only for the received signal r(m). In addition, a difference between the added error signal aderr$_2$ and any one of the remaining added error signals is larger than that obtained for aerr$_1$, indicating that the discrimination according to the present invention has a lower possibility of incorrect discrimination due to noises and there is a higher probability that {0, 1} is the correct maximum likelihood sequence.

As described above, the automatic equalizer according to the present invention selects the transmission symbol sequence having the smallest error by using the added error signal given by means of adding the square error signals obtained from the estimated error signals for the delayed received signal(s).

What is claimed is:

1. An automatic equalization method used to receive and equalize a digital data signal comprising transmission symbols adapted to have k levels, comprising the steps of:

receiving a channel impulse response having a length of M (where M is a natural number), a $k^{M-j}$ number of transmission symbol sequences each having a length of (M−j) (0≦j≦M−1, where j is an integer), and a discrimination result, to produce a $(k^{M-j}+K^{(M-j-1)}+ \ldots +k^{(M-J-+1)})$ number of estimated received signals (N≦(M−j), where N is a natural number);

subtracting a plurality of said estimated received signals from an N number of delayed received signals r(m), r(m−1), . . . , r(m−(N−1), respectively, said N number of delayed received signal(s) being between a received signal at a time instant m and a received signal at a time instant (m−(N−1)), to produce a $(k^{(M-j)}+k^{(M-j-1)}+ \ldots +k^{(M-j-N+1)})$ number of estimated error signals;

squaring each of said estimated error signals to produce a $(k^{M-j}+k^{(M-j-1)}+ \ldots +k^{(M-j-N+1)})$ number of square error signals;

receiving said square error signals to add thereto the square error signals, respectively, obtained from said square error signals in accordance with an N number of said estimated received signals having the same previous transmission symbol sequence, thereby to produce a $k^{(M-j)}$ number of added error signals; and producing, as said discrimination result, a portion of said transmission symbol sequence that corresponds to the minimum one of a $k^{(M-j)}$ number of said added error signals.

2. An automatic equalizer that is supplied with and equalizes a digital data signal comprising transmission symbols adapted to have k levels, comprising:

a parallel received signal estimation circuit that is supplied with a channel impulse response having a length of M (where M is a natural number), a $k^{(M-j)}$ number of transmission symbol sequences each having a length of (M−j) (0≦j≦(M−1), where j is an integer), and a discrimination result and that produces a $(k^{(M-j)}+k^{(M-j-1)}+ \ldots +k^{(M-j-N+1)})$ number of estimated received signals (N≦M−j), where N is a natural number);

a group of a plurality of estimated error output circuits that are supplied with at least one of an N number of delayed received signals r(m), r(m−1), . . . , r(m−(N−1) and supplied with said estimated received signals, respectively, said N number of delayed received signals being between a received signal at a time instant m and a received signal at a time instant (m−(N−1)), and that produce a $(k^{(M-j)}+k^{(M-j-1)}+ \ldots +k^{(M-j-N+1)})$ number of estimated error signals;

a group of a plurality of absolute value squaring arithmetic circuits that are supplied with said estimated error signals and that produce a plurality of square error signals by carrying out absolute value squaring arithmetic operation;

a group of a $k^{(M-j)}$ number of adders that are supplied with said square error signals to add thereto the square error signals, respectively, obtained from said square error signals in accordance with an N number of said estimated received signals having the same previous transmission symbol sequence, thereby to produce a $k^{(M-j)}$ number of added error signals; and a discriminator that is supplied with said $k^{(M-j)}$ number of added error signals and that produces, as said discrimination result, a portion of said transmission symbol sequence that corresponds to the minimum one of said $k^{(M-j)}$ number of added error signals.

3. An automatic equalizer as claimed in claim 2, wherein said parallel received signal estimation circuit comprises:

delay circuits that are supplied with said discrimination result and delay it by the time intervals corresponding to 1 through (N−1) symbols to produce delayed signals as an (N−1) number of delayed discrimination results dd (m−1), dd (m−2), . . . , dd (m−N+1);

a $k^M$ number of vector inner product arithmetic circuits for obtaining an inner product of a channel impulse response vector formed of the respective elements of said channel impulse response having the length of M with a transmission signal candidate vector having, as the elements, a $k^M$ number of said transmission symbol sequences each having the length of M, to produce a $k^M$ number of estimated received signals corresponding to said received signal r (m) as a part of said $(k^{(M-j)}+k^{(M-j-1)}+ \ldots +k^{(M-j-N+1)})$ number of estimated received signals; and a $k^{(M-i-j)}$ number of vector inner product arithmetic circuits for obtaining an inner product of said channel impulse response vector with a transmission signal candidate vector having, as the elements, an (M−i) number of lower transmission symbol sequences (1≦i≦N−1, where i is an integer) of a $k^M$ number of said transmission symbol sequences each having the length of M and said delayed discrimination results dd(m−1), dd(m=2), . . . , dd(m−i), to produce a $k^{(M-i-j)}$ number of estimated received signals corresponding to said delayed received signal r(m−i) as a remaining part of said $(k^{(M-j)}+k^{(M-j-1)}+ \ldots +k^{(M-j-N+1)})$ number of estimated received signals.

4. An automatic equalizer as claimed in claim 2, wherein said parallel received signal estimation circuit comprises:

delay circuits that are supplied with said discrimination result and delay it by the time intervals corresponding to 1 through (j+N−1) symbols (1≦j≦M−1, j is an integer) to produce delayed signals as a (j+N−1) number of delayed discrimination results dd(m−1), dd(m−2), . . . , dd(m−j−N+1);

a $k^{(M-j)}$ number of vector inner product arithmetic circuits for obtaining an inner product of a channel impulse response vector formed of the respective elements of said channel impulse response having the length of M with a transmission signal candidate vector having, as the elements, a $k^{(M-j)}$ number of said transmission symbol sequences each having the length of (M−j) and said delayed discrimination results dd(m−1), dd(m−2), . . . , dd(m−j), to produce a $k^{(M-j)}$ number of estimated received signals corresponding to said received signal r(m) as a part of said $(k^{(M-j)}+k^{(M-j-1)}+ \ldots +k^{(M-j-N+1)})$ number of estimated received signals; and a $k^{(M-i-j)}$ number of vector inner product arithmetic circuits for obtaining an inner product of said channel impulse response vector formed of the respective elements of said channel impulse response having the length of M with a transmission signal candidate vector having, as the elements, an (M−j−i) number of lower transmission symbol sequences (0≦i≦N−1, where i is an integer) of a $k^{(M-j)}$ number of said transmission symbol sequences each having the length of (M−j) and said delayed discrimination results dd(m−1), dd(m−2), . . . , dd(m−i−j), to produce a $k^{(M-j)}$ number of estimated received signals corresponding to said delayed received signal r(m−i) as a remaining part of said $(k^{(M-j)}+k^{(M-j-1)}+ \ldots +k^{(M-j-N+1)})$ number of estimated received signals.

5. An automatic equalizer that is supplied with and equalizes a digital data signal comprising transmission symbols adapted to have k levels, comprising:

means that is supplied with a channel impulse response having a length of M (where M is a natural number), a $k^{(M-j)}$ number of transmission symbol sequences each having a length of (M−j) (0≦j≦(M−1), where j is an integer), and a discrimination result and that produces a $(k^{(M-j)}+K)$ number of estimated received signals;

means for subtracting a $k^{(M-j)}$ number of said estimated received signals from a received signal r(m) at a time instant m and subtracting a k number of said estimated received signals from a received signal r(m−1) at a time instant (m−1) to produce a $(k^{(M-j)}+k)$ number of estimated error signals;

means for squaring a $(k^{(M-j)}+k)$ number of said estimated error signals to produce a $(k^{(M-j)}+k)$ number of square error signals;

means for adding, to a $k^{(M-j)}$ number of said square error signals, the square error signals, respectively, obtained from said square error signals in accordance with an N number of said estimated received signals having the same previous transmission symbol sequence, thereby to produce a $k^{(M-j)}$ number of added error signals; and means that is supplied with said $k^{(M-j)}$ number of added error signals and that produces, as said discrimination result, a portion of said transmission symbol sequence that corresponds to the minimum one of said $k^{(M-j)}$ number of added error signals.

* * * * *

UNITED STATES PATENT AND TRADEMARK OFFICE
CERTIFICATE OF CORRECTION

PATENT NO. : 6,292,510 B1  Page 1 of 1
DATED : September 18, 2002
INVENTOR(S) : Yoshikazu Kakura It is certified that error appears in the above-identified patent and that said Letters Patent is hereby corrected as shown below:

Column 6,
Line 38, "0.24-0=0.24" should read -- 0.34 - 0.1 = 0.24 --
Line 39, "0.24-0.3=-0.06" should read -- 0.34 - 0.4 = -0.06 --
Line 40, "0.24-0.2=0.04" should read -- 0.34 - 0.3 = 0.04 --
Line 41, "0.24-0.5=-0.26" should read -- 0.34 - 0.6 = -0.26 --
Line 45, "0.15-0=0.15" should read -- 0.45 - 0.3 = 0.15 --
Line 46, "0.15-0.2=-0.05" should read -- 0.45 - 0.5 = -0.05 --
Line 49, "24 | $_2$" should read -- 24 |$^2$ --
Line 52, "err" should read -- | err|$_4$|$^2$ --
Line 58 "aderr," should read -- aderr$_1$ --

Column 7,
Line 30, "K" should read -- k --
Line 31, "k$^{(M-J-+1)}$)" should read -- k$^{(M-j-N+1)}$ ) --
Line 64, "after "j" delete ")"

Column 8,
Line 52, "m=2" should read -- m-2 --

Column 9,
Line 21, "K$^{(M-j)}$" should read -- k$^{(M-i-j)}$ --

Column 10,
Line 6, "K" should read -- k --

Signed and Sealed this

Eighteenth Day of March, 2003

JAMES E. ROGAN
*Director of the United States Patent and Trademark Office*